Feb. 9, 1937.　　　　S. M. BECMER　　　　2,069,936

DIRECTION INDICATOR SWITCH

Filed March 27, 1934　　　2 Sheets-Sheet 1

Inventor
S. M. Becmer
By Clarence A. O'Brien
Attorney

Feb. 9, 1937.  S. M. BECMER  2,069,936
DIRECTION INDICATOR SWITCH
Filed March 27, 1934  2 Sheets-Sheet 2
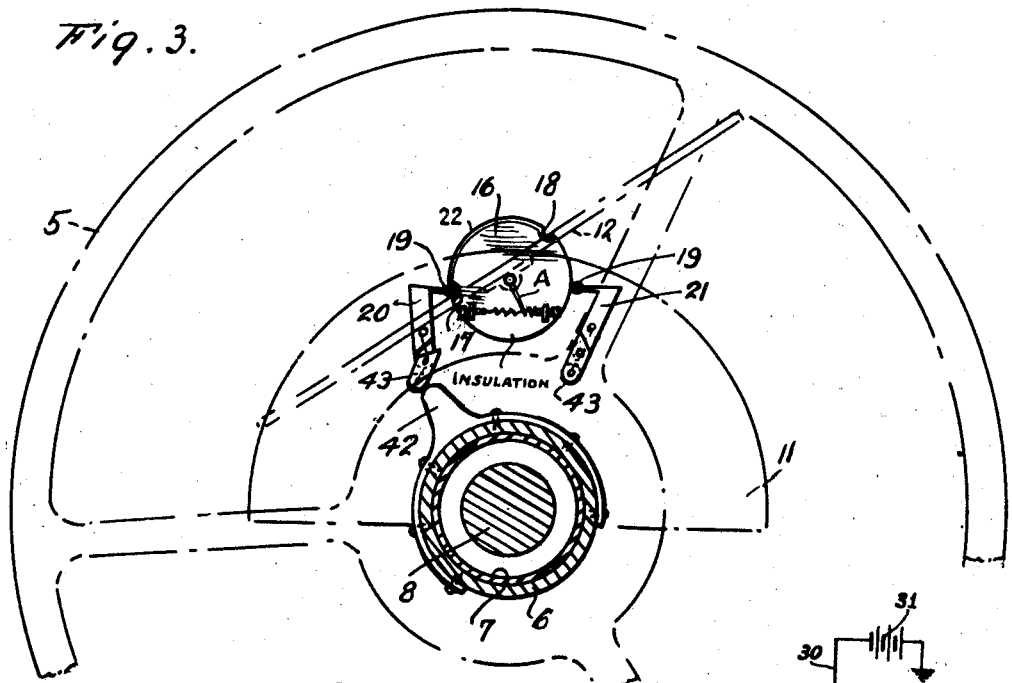
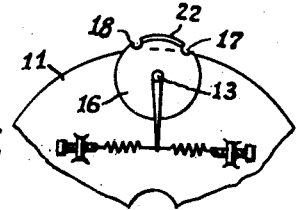
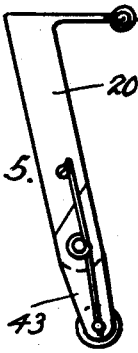
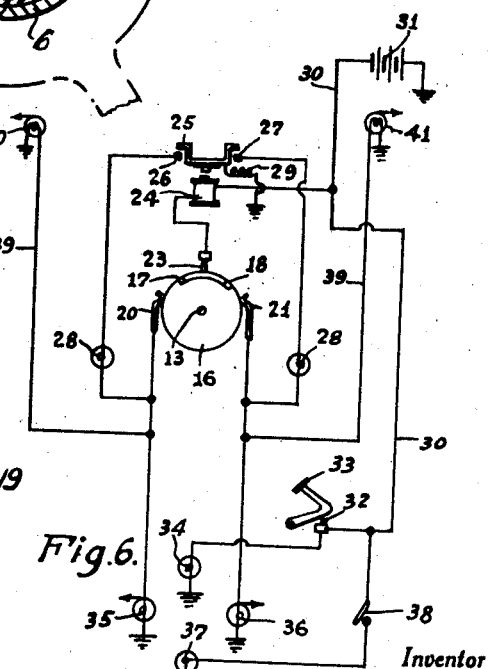
Inventor
S. M. Becmer
By *Clarence A. O'Brien*
Attorney Patented Feb. 9, 1937

2,069,936

UNITED STATES PATENT OFFICE 2,069,936

DIRECTION INDICATOR SWITCH

Stephen M. Becmer, Bayonne, N. J.

Application March 27, 1934, Serial No. 717,629

2 Claims. (Cl. 200—59)

My present invention pertains to direction indicator switches, and contemplates the provision of the simple and reliable switch hereinafter described and definitely claimed.

In the accompanying drawings, forming part of this specification:

Figure 3 represents a sectional view taken substantially on line 3—3 of Figure 2.

Figure 4 represents an edge elevational view of one of the rockable contactors.

Figure 5 represents a side elevational view of one of the contactors.

Figure 6 represents a diagrammatic view of the electrical connections between the electrical device involved.

Figure 7 is a detail view illustrating one type of spring action for returning the disk to normal position subsequently to movement and release of the disk.

Figure 2:
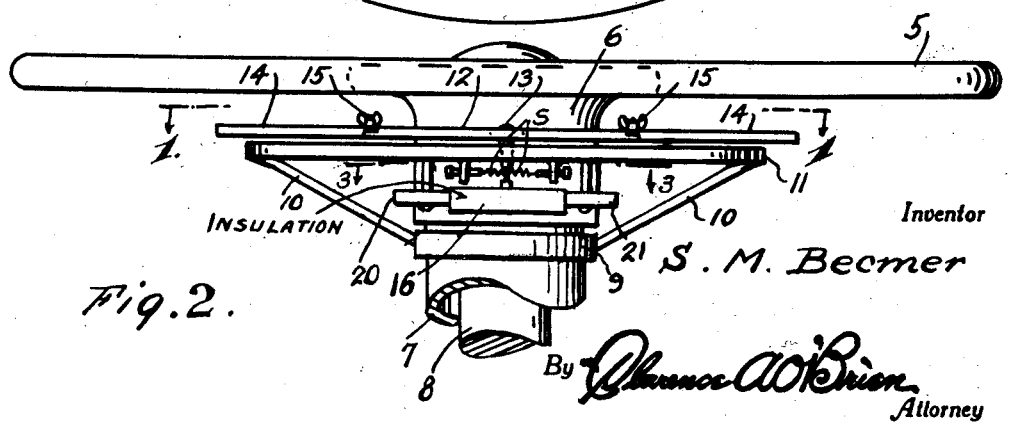
Figure 2 represents a front elevational view of the direction indicator switch illustrating its arrangement relatively to the steering post and steering wheel of an automobile.

Referring to the drawings wherein like numerals designate like parts, it can be seen in Figure 2, that numeral 5 represents the usual steering wheel which is provided with the hub 6 disposed over the upper end portion of the housing 7 for the steering shaft 8.

Numeral 9 represents a clamp band on the stationary housing 7 from which extends the upwardly inclined arms 10 connecting to the semicircular shaped plate 11 which rests against the hub 6, but is not connected thereto.

Numeral 12 represents a rockable bar swingably connected, as at 13, to the curved edge portion of the plate 11, and this is provided with end portions 14 adjustably connected to the ends of the bar 12, as at 15. The element 13 is a pin which is fixed to the bar 12 and extends downwardly through and is journalled in the plate 11 and is fixed to the disk 16, the bar 12 being adapted to rotate the disk so as to register one or the other of the notches 17—18 thereof with the roller end 19 of the corresponding contactor 20 or 21. The periphery of the disk 16 is provided with a contact strip 22, Figures 1, 3 and 6, which has the aforementioned notches 17—18 therein, and which engages a brush 23 which is connected to one side of the electro-magnet 24 (see Figure 6).

A contactor 25 is within the path of the magnetic flux of the electro-magnet 24 and has a pair of contact elements for engagement with stationary contacts 26—27, each connected to a corresponding pilot lamp 28. The other side of the electro-magnet 24 is connected, as at 29, to the contactor 25 and also to the lead 30 from the battery 31. The lead 30 extends to the brake switch 32, the opposite side of the brake switch 32 in turn being connected to the usual stop light 34. The contactors 20—21 are connected to the left and right direction signal lamps 35—36. A parking lamp 37 is connected by way of the switch 38 to the battery lead 30. Branch wires 39—39 extend to the front signal lamps 40—41.

Figure 1:
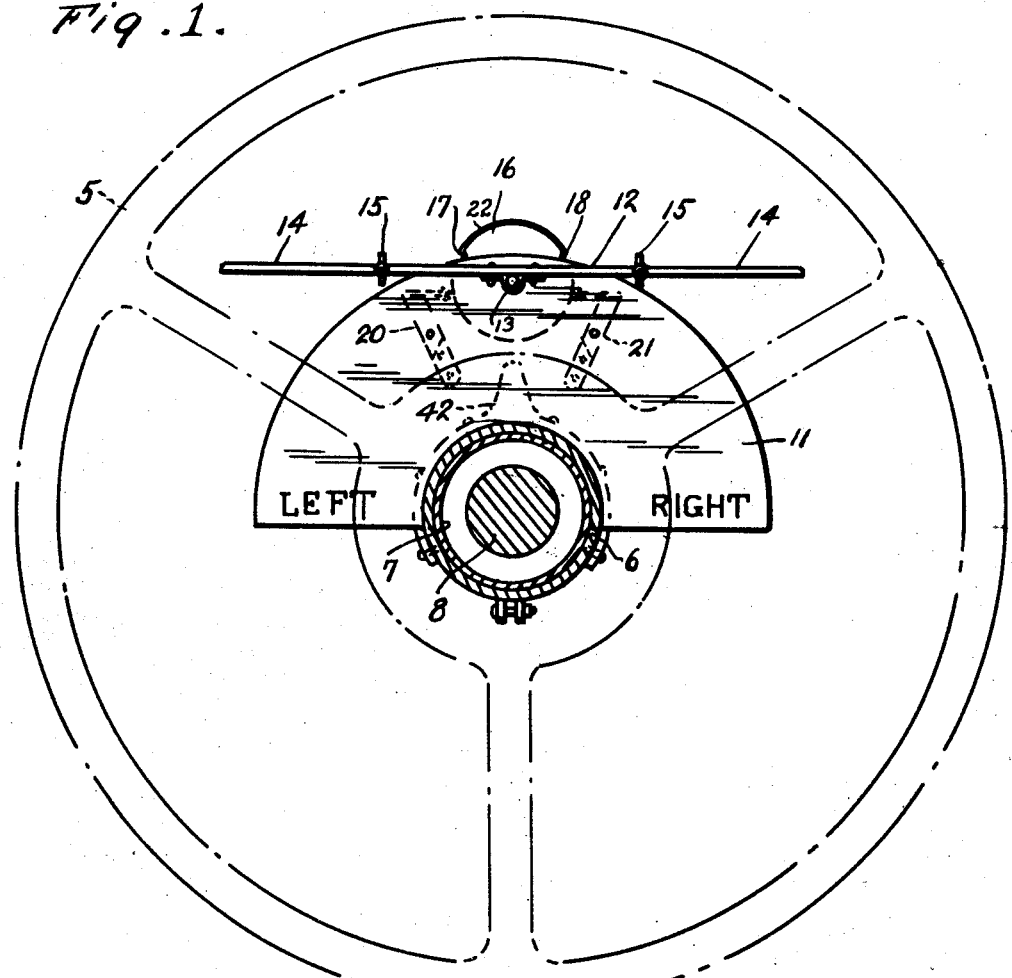
Figure 1 represents a horizontal sectional view through the upper portion of the steering column of an automobile taken substantially on line 1—1 of Figure 2.

As is clearly shown in Figure 3, the hub 6 of the steering wheel is provided with a protuberance 42 which operates within the path of the swingable extensions 43 on the innermost end portions of the swingable contactors 20—21. These end portions 43 are capable of swinging outwardly, but when engaged to swing inwardly form a positive connection with the contactors so as to disengage the roller ends thereof with respect to the contact strip 22 so as to release the roller ends from the notches to permit the disk 16 to be automatically returned by the springs S through the medium of the arms A, as shown in Figures 2 and 3 to a centralized position, such as shown in Figure 1 and also in the diagrammatic view, Figure 6.

In operation, it can be seen that the hand bar 12 is first actuated so as to set the switch by engaging one or the other of the roller ends of the contactors 20—21 with its corresponding notch 17—18. This results in the energization of either one of the signal lights on the left or right side of the vehicle, which will remain energized until the turn of the vehicle has been completed and as the wheels are straightened out, the protuberance 42 will engage against the adjacent swingable member 43 and rock the contactor so that its roller end disengages from the corresponding notch of the disk 16, thus disrupting the particular signal circuit.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:—

1. The herein described improvement in direction indicator switches, comprising a steering wheel, a shaft fixed to the wheel, a stationary housing for said shaft, a protuberance on the wheel, a plate fixed to said housing adjacent the protuberance, switch levers having inner and outer arms spaced apart and fulcrumed on said plate the inner arms being arranged in the path of the protuberance, a pin journaled in said plate, a disk disposed parallel to the plate and fixed to said pin and having a contact section at its periphery, said contact section being provided with spaced notches to seat the outer arms of the switch levers, a spring action for automatically returning the disk to a normal central position, and a hand bar fixed to said pin and through the medium of the same to the disk and extending in opposite directions from the pin.

2. The herein described improvement in direction indicator switches, comprising a steering wheel, a shaft fixed to the wheel, a stationary housing for said shaft, a protuberance on the wheel, a plate fixed to said housing adjacent the protuberance, switch levers having inner and outer arms spaced apart and fulcrumed on said plate the inner arms being arranged in the path of the protuberance, a pin journaled in said plate, a disk disposed parallel to the plate and fixed to said pin and having a contact section at its periphery, said contact section being provided with spaced notches to seat the outer arms of the switch levers, a spring action for automatically returning the disk to a normal central position, and a hand bar fixed to said pin and through the medium of the same to the disk and extending in opposite directions from the pin; the switch lever arms opposed to said protuberance being in the form of spring controlled sections arranged to swing laterally outward under pressure of the protuberance and also arranged on reverse movement of the protuberance to impart movement to the levers and thereby disengage the same from the notches of the disk.

STEPHEN M. BECMER.